United States Patent [19]

Beatty

[11] Patent Number: 5,846,447
[45] Date of Patent: Dec. 8, 1998

[54] PROCESS FOR FORMING A DISPERSION OF POLYTETRAFLUOROETHYLENE

[75] Inventor: Richard P. Beatty, Wilmington, Del.

[73] Assignee: E. I. du Pont de Nemours and Company, Wilmington, Del.

[21] Appl. No.: 918,417

[22] Filed: Aug. 26, 1997

[51] Int. Cl.[6] .......................... C10M 105/52; C08F 2/16; C08F 2/46
[52] U.S. Cl. .............................. 252/58; 252/49.3; 252/54; 252/54.6; 252/56 R; 252/58; 252/358; 252/363.5; 525/192; 525/199; 525/200; 524/800; 524/805; 522/2; 522/3; 522/71; 522/74; 522/77; 522/78; 522/79; 522/80
[58] Field of Search ............................ 252/58, 49.3, 358, 252/363.5, 54, 54.6, 56 R; 525/199, 200; 524/800, 805; 522/2, 3, 71, 74, 77, 78, 79, 80

[56] References Cited

U.S. PATENT DOCUMENTS

| | | | |
|---|---|---|---|
| 3,194,762 | 7/1965 | Browning et al. | 252/51.5 |
| 3,432,511 | 3/1969 | Reiling | 526/254 |
| 3,875,262 | 4/1975 | Milne | 525/199 |
| 4,127,491 | 11/1978 | Reick | 252/16 |
| 4,224,173 | 9/1980 | Reick | 252/52 A |
| 4,284,578 | 8/1981 | De Lathauwer et al. | 554/169 |
| 4,349,444 | 9/1982 | Reick | 252/16 |
| 4,465,607 | 8/1984 | Cottell | 252/58 |
| 4,806,281 | 2/1989 | Huth | 252/58 |

OTHER PUBLICATIONS

Microfluidics Insternational Corporation, Newton, MA, *Innovation through Microfluidizer Technology*, GB100–1, 1995.

*Primary Examiner*—Samuel A. Acquah

[57] ABSTRACT

A process for forming a dispersion of polytetrafluoroethylene particles in a liquid containing a dispersant by passing the mixture through a plurality of nozzles within a liquid-jet interaction chamber at a pressure of to deagglomerate and stabilize the polytetrafluoroethylene particles.

7 Claims, 2 Drawing Sheets

PROCESS FOR FORMING A DISPERSION OF POLYTETRAFLUOROETHYLENE

The present invention relates to a method for forming superior dispersions of polytetrafluoroethylene and other fluorocarbon polymer particles in liquids, especially lubricating fluids.

BACKGROUND OF THE INVENTION

Fluorocarbon polymers such as polytetrafluoroethylene (PTFE) are known for their properties of high chemical resistance and low friction. These materials have such low frictional properties that they have been used alone or in combination with lubricants to provide lubrication between metal surfaces operating at high pressures. For example, lubricant formulations containing PTFE are currently available as additives for motor oil for passenger cars where the PTFE reduces friction and wear in the engine.

To be an effective lubricant, the particles of the PTFE must be very small and well dispersed into the carrier fluid. A small particle size ensures that the PTFE particles can enter in between the closely spaced moving parts that are to be lubricated without blocking or plugging small passages. In addition small particles, particularly those 0.5 microns or less in size, can be maintained in a stable, dispersed state by Brownian motion. Such small particles can remain dispersed in a fluid indefinitely so long as the particles do not flocculate. Finally, such small particles can readily pass through an engine oil filter without being removed or plugging the filter.

Various techniques have been taught to produce a stable PTFE dispersion for use in lubricants.

U.S. Pat. No. 3,194,762 to Browning and Walz taught the use of plastic particles formed in a special precipitation process in lubricants. The special precipitation process was to assure that the particle size of the plastics was small enough to form a stable dispersion on mixing with a carrier fluid. But Browning and Walz provided no teaching concerning the use of dry PTFE particles.

To improve the dispersion of PTFE in liquids, U.S. Pat. No. 3,432,511 to Reiling taught that the PTFE particles should be heated to temperature of 785° to 880° F. to produce some level of thermal degradation and the loss of mechanical properties in the particles. In a preferred embodiment Reiling teaches that sintered PTFE, such as the scrap left over from a gasket punching operation, may be heated and ground to a powder. This process is known to produce large particles. Such large particles will not stay suspended in carrier fluids and may clog small passageways or filters.

In U.S. Pat. No. 4,806,281, Huth taught the use of a special apparatus that provided a heat treatment in order to make a small particle dispersion of PTFE. The purpose of the heat treatment was to bind an antistatic or wetting agent to the PTFE particles and thereby improve their ability to wet and adhere to metal parts. The mixing process described is a low-shear, low intensity process unlikely to produce a very fine dispersion.

In U.S. Pat. No. 4,465,607 Cottell taught the use of sonic agitation to produce a dispersion of PTFE in a lubricating oil. The heart of the process is a sonic mixing chamber wherein the mixture of PTFE and oil is subjected to sonic energy to accomplish violent mixing. The process is carried out under low pressures (10–200 psig). Furthermore, Cottell's process does not teach use of a dispersant. The inventor has found that dispersions prepared without dispersant are extremely viscous and difficult to handle, and tend to settle when diluted with oil for use in an engine or other machinery. Sonic devices have several common undesirable features, including excessive sample heating, which can cause degradation, titanium contamination from the sonic probe tip itself, and difficulty in ensuring that all of the material is uniformly processed, due to "dead" zones in the sonic mixing area.

In U.S. Pat. No. 3,875,262 Milne taught the use of synthetic organic polymers to stabilize dispersions of preformed solid synthetic organic polymers in organic liquids for use in coatings. No compositions are described for use in lubricants, and the stabilizing polymers described are not used in lubricants. Other, more recent patents do specifically address PTFE dispersions for lubricants, such as those by Reick, for example, as U.S. Pat. No. 4,224,173. This art teaches that multiple additives and complicated processes are necessary to obtain stable, high-quality dispersions. Such delicately balanced formulations have a high potential for incompatibility with other ingredients in the fully formulated lubricant. Simple compositions are desirable to minimize the potential for incompatibility.

PTFE dispersions are available commercially, such as SLA-1612 (SLA-1612 is a trademark of Acheson Colloids Company, Port Huron, Mich.). A PTFE concentrate is also available from Mechtrol, Nutley, N.J. Although these appear to be the best PTFE dispersions currently available commercially, the inventor has observed that undesirable settling of PTFE still occurs, particularly in formulated products wherein a minor amount of the PTFE concentrate is diluted with a major amount of other ingredients, such as a motor oil for use in internal combustion engines.

Although suitable PTFE powders are commercially available having a primary particle size less than about 0.5 microns, as noted above, the primary particles in such dry powders are always agglomerated. Special techniques are required to break-up agglomerated particles so that a fine particle dispersion may be formed in the lubricant. The direct use of unagglomerated ex-reactor dispersion from the manufacture of the polymer particles themselves has been suggested as a way to ensure that the smallest possible particles are present in the dispersion. But such ex-reactor dispersions contain water, and the particles and the water become incorporated into the lubricant. The presence of water in the lubricant is not desirable. Furthermore, dispersants may not be effective with PTFE that has had no surface functionalization.

PTFE dispersions may be prepared by polymerization in CFC (chlorofluorocarbon) solvents instead of in water but the use of these solvents is also undesirable for environmental reasons.

Dry PTFE powders have been dispersed using equipment such as conventional grinding equipment, fluid energy mills and ultrasound equipment. In the case of the milling and grinding equipment which typically use grinding media, the desired product is always contaminated with fine wear debris from the mill and/or the media. The inventor has also found that common media-free techniques such as colloid mills or rotor-stator dispersers are not generally effective in deagglomerating the fine particles of PTFE well enough to obtain a stable dispersion.

Also the prior art has taught a variety of additives such as dispersants and thickeners to inhibit flocculation of the dispersed PTFE powders. For example, in U.S. Pat. No. 4,127,491, U.S. Pat. No. 4,224,173, and U.S. Pat. No. 4,284,518, Reick describes a lubricating oil containing PTFE which required as many as 8 separate components and a multi-step process to obtain a stable product. These patents use aqueous ex-reactor PTFE, and so also suffer from incorporating undesirable water into the lubricant product.

The present invention offers an effective means for forming and stabilizing the PTFE particle dispersion without introducing unnecessary additives that increase the cost and complexity of the PTFE containing lubricant.

The present invention also offers a means of dispersing the PTFE without the potential introduction of contamination from grinding or additives which have undesirable effects on the lubricant's properties. The present invention also offers a means to disperse dry PTFE micropowder, avoiding introduction of undesirable water into the lubricant product.

The object of the present invention is to provide a uniform, stable dispersion of PTFE, formed from dry PTFE powders, in lubricants or carrier fluids.

Another object of the present invention is to provide PTFE dispersions of improved stability which are free of contamination.

SUMMARY OF THE INVENTION

The present invention provides a process for forming a dispersion of dry polytetrafluoroethylene particles in an organic carrier fluid comprising the steps of:
(a) surface functionalizing the polytetrafluoroethylene particles having an average primary particle size of less than 1 micron with electron beam or gamma irradiation of at least 4 Mrad in the presence of atmospheric oxygen and water or selecting polytetrafluoroethylene particles having an average primary particle size of less than 1 micron that have been subjected to electron beam or gamma irradiation of at least 4 Mrad in the presence of atmospheric oxygen and water to functionalize the particle surface;
(b) mixing the irradiated particles with the liquid and at least one dispersant in an amount sufficient to stabilize the dispersion to form a mixture;
(c) passing the mixture, at least once, through a plurality of nozzles within a liquid-jet interaction chamber at a pressure of at least 1000 psi to deagglomerate the polytetrafluoroethylene particles.

The preferred PTFE for the present invention is a dispersion polymer with an average primary particle size of about 0.25 microns or smaller.

The preferred dispersant for the present process is characterized in that it has a molecular structure having an interacting group which can interact with the surface-functionalized particles, a solubilizing group which can interact with the carrier fluid of the dispersion and a sufficiently high molecular weight to provide effective steric stabilization for the dispersed particles.

It is also preferred that the carrier fluid be a lubricant and selected from the group consisting of paraffinic and naphthenic mineral oils, hydrocracked mineral oils, solvent refined oils, and blends of these oils, aromatic and aliphatic hydrocarbons, polyalphaolefins, hydrogenated polyalphaolefins, alkylated aromatics, esters, diesters, polyol esters, and complex esters, phosphate esters, dihydrocarbyl carbonates, ethers, polyalkylene glycols, perfluoroalkyl polyethers, silicone fluids, silahydrocarbons, alcohols, ketones, amines, and heterocyclic compounds, N-methyl pyrolidinone, isophorone, and tetrahydrofuran and mixtures of any combination of these.

BRIEF DESCRIPTION OF THE DRAWINGS

FIG. 1-B shows a transmission electron photomicrograph of a commercially available PTFE dispersion.

DETAILED DESCRIPTION

Figure 1A:
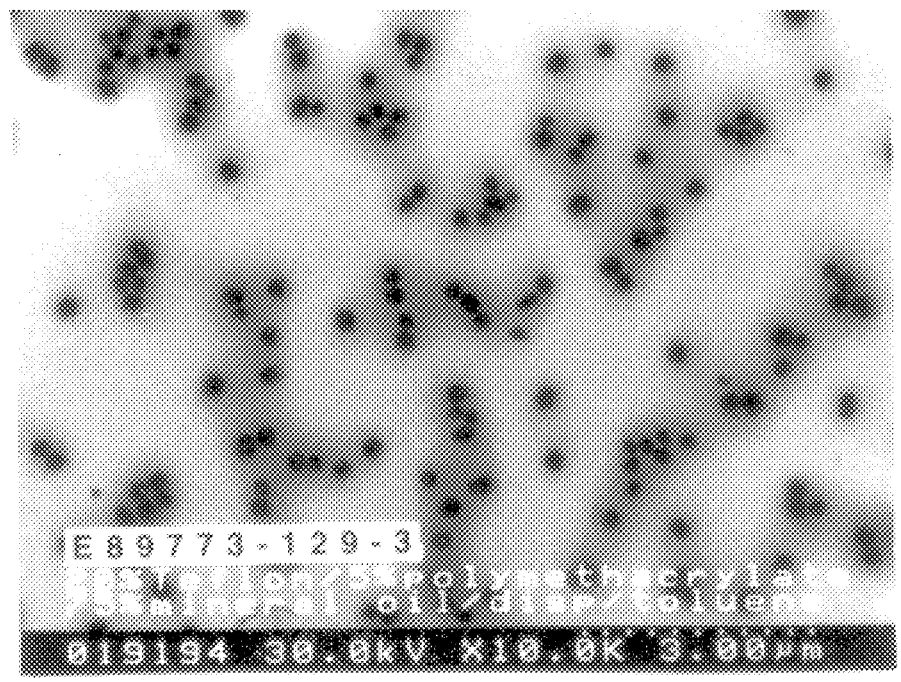
FIG. 1-A shows a transmission electron photomicrograph of a PTFE dispersion prepared by the method of the present invention.

The present process provides a method for preparing a stable dispersion, of dry PTFE powder in a lubricant fluid, that is free of contamination such as that which results from using grinding as a means of dispersing. Dispersions of PTFE formed by the present process are superior to those produced by the conventional grinding methods as well as superior to those commercially available as is illustrated in the Figures and the Examples below.

The PTFE particles preferred for use in the present process are manufactured by a dispersion polymerization process. Dispersion polymerization is well known (see S. V. Gangal in Kirk-Othmer Encyclopedia of Chemical Technology, $4^{th}$ Edition, Volume 11, pages 621–644 (1994)). Suitable PTFE particles are available commercially.

In the present process the PTFE particles are first treated to give them surface functionality, and then they are mixed with a dispersant and passed, at least once, through a plurality of nozzles within a liquid jet interaction chamber such as is found in a Microfluidizer manufactured by Microfluidics International Corporation of Newton, Mass. The term surface functional or surface functionalized means increasing the density of surface functional groups on the PTFE particle to a greater density than that of unfunctionalized polymer. These surface functional groups are believed to provide sites needed for interaction with the dispersant. Techniques to provide surface functionality to the PTFE particles are known in the art and include thermal degradation by heating, gamma or electron beam irradiation, and other such techniques. For the present invention, the preferred method of surface functionalization is by irradiation.

Irradiation is known in the art as a way to degrade PTFE to render it more friable, for example as described by Brown and Rodway in UK 1,354,471.

In the case of gamma or electron beam irradiation in air, carboxylic acid and carboxylic acid fluoride groups are introduced on the surface of the PTFE particle. These functional groups are believed to be formed largely on the surface of the particle, but may be formed in the interior of the particle as well. This is well know in the art, as described, for example, by W. K. Fisher in the Journal of Industrial Irradiation Technology, 1(2), pages 105–139 (1983). The number of acid and acid fluoride groups can be determined by infrared analysis as described in U.S. Pat. No. 5,547,761. Once introduced by irradiation, these carboxylic acid and acid fluoride groups may be modified by conventional chemical reactions. Examples of such well-known reactions include reactions with alcohols to give esters, reactions with ammonia, primary or secondary amines to give amides, and reactions with amines and other bases to give salts. These carboxylic acid and acid fluoride groups, or derivatives thereof, are the surface functionality needed as interaction sites on the particle surface for the carrier fluid (lubricant) and/or a dispersant. Without this surface functionalization, the surface of the PTFE has very few functional groups other than fluorocarbon CF2 groups. The predominantly fluorocarbon surface interacts with the carrier fluid or dispersant only via very weak interactions and does not form the stabilizing associations necessary for a non-settling dispersion. A PTFE dispersion formulation that will be stable for extended service in a lubricant system requires both surface-functionalized PTFE particles and a suitable dispersant. The present invention requires this combination: a functionalized PTFE particle surface, selected particle size distribution, a compatible dispersant and carrier fluid, and the high energy dispersion process, and it is this combination that provide a stable dispersion requiring no other additional additives or treatments. Irradiated commercial dry dispersion-polymerized PTFE particles having the desired particle size distribution may be used in the process of the present invention.

The weight percent of PTFE in the dispersions of the present invention may range from about 0 to about 25% by weight of the total dispersion. A concentration of about 20% of PTFE is preferred since a small amount of such a concentrate can be diluted by blending with other ingredients to formulate a final product. Higher concentrations than 25% PTFE may be made so long as the slurry of PTFE particles, dispersant and carrier fluid can be pumped through the plurality of nozzles within the liquid jet interaction chamber.

PTFE powders suitable for dispersion by the present process are commercially available. In particular, commercial products having primary particle size of approximately 0.25 micron or smaller that have been subjected to the required irradiation are available. Also dry powders of PTFE which are obtained by coagulating the ex-reactor dispersion of PTFE followed by drying may be used in the present invention after they have been subjected to irradiation.

A variety of stabilizers or dispersants may be used in the process of the present invention. The inventor has discovered that certain dispersant polymers used commercially in motor oil formulations as multifunctional dispersants and viscosity index improvers (so-called dispersant VI improvers) work especially well as dispersants for PTFE in oil. In an internal combustion engine, these dispersants function to keep combustion byproducts and oil degradation products in a dispersed, suspended state so that they do not coat onto internal engine surfaces as sludge. The specific composition of these materials is often proprietary, but the general chemistry and features are well known, as described, for example, by R. L. Stambaugh in Chapter 5 of Chemistry and Technology of Lubricants (edited by R. M. Mortier and S. T. Orszulik, VCH Publishers, Inc., NY 1992). Some polymer additives from Texaco have been described by M. K. Mishra and R. G. Saxton in Chemtech, April 1995, pp 35–41. Examples of commercial dispersants include Acryloid 954, 956, and 985 from RohMax, Paratone 8510 and 8511 from Paramins, TLA 626A, 646, 656, 1605, and 7700 from Texaco, MobilAD C203 from Mobil, and HiTec 5710 and 5725 from Ethyl. Acryloid 956 from RohMax, believed to be of the polymethacrylate type, is a preferred dispersant.

Other stabilizers, compatible with the carrier fluid, may also be used. The primary requirement for a stabilizer that may be used in the present invention is that the stabilizer have a molecular structure having (1) an interacting group which can interact with the surface-functionalized PTFE micropowder and (2) a solubilizing group which can interact with the carrier fluid of the dispersion and (3) sufficiently high molecular weight to provide effective steric (entropic) stabilization for the dispersed PTFE. Steric stabilization is a dispersion stabilization mechanism whereby the stabilizer becomes attached to the particle surface, forming a protective layer or shell around the particle which prevents other particles from approaching closely enough to cause flocculation. This stabilization mechanism has been described in the context of pigments and non-aqueous coatings by Henry L. Jakubauskas in the Journal of Coatings Technology, volume 58, pages 71–82 (1986). Applicable stabilizers are usually polymeric, but they may be random, block, graft, or other types of polymers. Dispersant VI improvers used in motor oil are examples of stabilizers which meet the preceding criteria. For example, Acryloid 956, one of the most preferred dispersants, is believed to be a random polymer of a mixture of short-, medium-, and long-chain methacrylate esters believed to contain pyrrolidinone moieties from 1-vinyl-2-pyrrolidinone attached to the polymethacrylate by a grafting process. The mixed-chain-length acrylate esters render the polymer soluble in oil while the pyrrolidinone functionality provides interacting sites for interaction with surface-functionalized PTFE. Dispersant VI improvers can also be prepared by grafting appropriate monomers with interacting groups onto oil-soluble olefin copolymers (for example, ethylene-propylene-diene polymers, EPDM polymers), which produces the so-called dispersant olefin copolymers (DOCPs). Paratone®, from Paramins, is believed to be of the DOCP type. In the case of polymethacrylates, the polymethacrylate polymer functions as the solubilizing group and the pyrolidinone as the interacting group. Block polymethacrylates containing amine functionality as the interacting group and long chain steryl ester as the solubilizing group are also effective dispersants for the process of the present invention.

The exact amount of dispersant required depends on the chemical nature of the dispersant, base fluid, and PTFE powder employed. Some dispersants are more effective than others and can be used at lower concentrations. The appropriate amount of dispersant must be determined in each case by preparing dispersions with varying amounts of dispersant and evaluating quality and stability of the resulting dispersion. This quality and stability evaluation may involve measuring viscosity, particle size distribution, sedimentation rate, uniformity of a coating on a surface, stability of the dispersion on dilution, and other properties known to those skilled in the art. The evaluation of a dispersion is illustrated in the Examples below.

Suitable carrier fluids or liquids comprise a wide variety of organic liquids, provided that the organic liquid should not appreciably dissolve the PTFE. Examples include, but are not limited to, mineral oils (both paraffinic and naphthenic, including various refinements such as hydrocracked mineral oils and solvent refined oils, and blends), aromatic and aliphatic hydrocarbons (which may have any combination of linear, branched, and cyclic structures, also including polyalphaolefins, hydrogenated polyalphaolefins, and alkylated aromatics), esters (including simple carboxylic acid esters, diesters, polyol esters, and complex esters as well as phosphate esters and dihydrocarbyl carbonates), ethers (including polyalkylene glycols and perfluoroalkyl polyethers), silicone fluids, silahydrocarbons, alcohols, ketones, amines, and heterocyclic compounds such as N-methyl pyrolidinone, isophorone, and tetrahydrofuran. Mixtures of these materials may be used. The carrier fluid is chosen to be compatible with the intended end use of the dispersion. For example, for motor oil applications, mineral oil or a high-boiling ester are preferred.

The inventor of the present invention has found that the formation of a superior PTFE dispersion requires two general steps: (1) the development of a formulation suitable for the intended use and (2) processing the formulation by at least one pass through a fluidizer.

The purpose of step 1 is to develop a formulation suitable for the intended end use of the dispersion. This step is important because the intended end use may restrict the choice of carrier fluid and, perhaps, dispersant as well as other additives, if one elects to employ other additives. For example, PTFE dispersion for use in motor oil must be compatible with commercial motor oils that it might eventually be mixed with. It is therefore logical to use a carrier fluid that is already common in motor oil, such as mineral oil, polyalphaolefin, or ester. Similarly, preferred dispersants may be those already used in motor oil, to avoid the need to qualify new materials and the potential for incompatibility with other motor oil additives.

Step 1, that is the determinations necessary for selecting the carrier fluid, and the dispersant and for the determination of the concentration of the dispersant, need not be carried out using the fluidizer such as the Microfluidizer, since the purpose of step 1 is to develop a formulation, not necessarily to achieve the highest possible degree of dispersion. Much can be learned from relative differences between different formulations. Thus, any suitable method of preparing dispersions can be used for step 1. Small scouting experiments may be conveniently performed by shaking test mixtures with sand in a paint shaker. The sand included in the mixture helps grind and disperse particles. The resulting dispersions can be evaluated visually by differences in viscosity, uniformity, and resistance to settling. With 20% PTFE, a very poor dispersion has a thick, mud-like viscosity while good dispersions are much more fluid, pouring readily. A smooth, uniform coating left by the dispersion running down the walls of the container indicates a good dispersion while streaking or spotting indicates a poor one. The amount of clarification near the surface of the dispersion and the thickness of the sediment layer after standing are both indications of quality, with less clarification and sediment indicating a higher quality dispersion. The ideal, of course, is no sedimentation or clarification at all.

Using these techniques, a wide range of formulations can be quickly prepared and evaluated. One or more formulations can then be chosen for use in step 2.

In step 2, a mixture of the formulation developed in step 1 is processed by at least one pass through a fluidizer such as the Microfluidizer, but operating conditions of the fluidizer must be optimized for each particular formulation. These conditions include operating pressure and number of passes through the equipment interaction zone. These two parameters can be controlled independently.

At least one pass through the fluidizer is required for dispersing the PTFE. Depending on operating conditions, 2 or 3 passes may be desirable to obtain a finer dispersion. Additional passes may be made, but we have found that, with sufficient operating pressure, most of the deagglomeration can be achieved in 2 passes so there is little need or additional benefit from the extra time and expense required for additional passes.

Unnecessary passes through the fluidizer should be avoided due to both time cost and performance reasons. With some dispersants, extra processing can actually decrease dispersion quality. The fluidizer subjects the process material to extremely high shear. It is well-known that high shear can physically degrade high molecular weight polymers. If, for example, the dispersant chosen in step 1 is susceptible to this type of shear degradation, excessive processing may reduce its effectiveness, and the dispersion quality may decrease. There is no non-experimental method by which the rate of shear degradation of an individual dispersant and the effect of this dispersant shear degradation on dispersion stability can be predicted. Manufacturers of dispersant VI improvers often report shear stability index (SSI) values, which gives an indication of shear stability of the polymer, and this may be used to help guide selection. However, fluidizing conditions must still be optimized experimentally. Test dispersions must be made over a wide range of operating pressures, using multiple passes at each pressure. Various techniques may be used to select the optimum processing conditions, including but not limited to particle size measurements, sedimentation testing, and end-use testing.

It is generally desirable to choose the lowest operating pressure and number of passes that gives the desired fineness of dispersion.

Higher operating pressures may impart more energy to the dispersing process and might be expected to give the finest dispersions in the fewest passes. However, high operating pressure also causes leaks and increases stress on the equipment, which may decrease equipment life and reliability. High operating pressure seems to exacerbate shear degradation of dispersant polymers, which may reduce the effectiveness of the dispersant and the quality of the PTFE dispersion.

Deagglomeration is the breaking up of agglomerates of particles into the separate individual primary particles that make up the agglomerate. Our experience shows that for deagglomeration, for example of PTFE micropowders, increasing operating pressure beyond the minimum required to break up the agglomerates to near primary particle size has no additional benefit. This is because once the agglomerates are broken down and separated into primary particles, no further size reduction occurs; primary particles are not fractured.

For these reasons, it is generally desirable to choose the lowest operating pressure to achieve the desired degree of dispersion in a minimum number of passes, usually 2 or, at most 3.

The process of the present invention is further described in the following non-limiting Examples.

As used below the term media volume means the amount of media charge in a media mill/the maximum amount of media that could be contained within that mill×100%.

The term fractional volume means the actual amount of media mill volume occupied by media, taking void space into account. A packing value of 0.6 (for spheres) gives a useful approximation; i.e. 100% media volume=60% fractional volume.

Figure 1B:
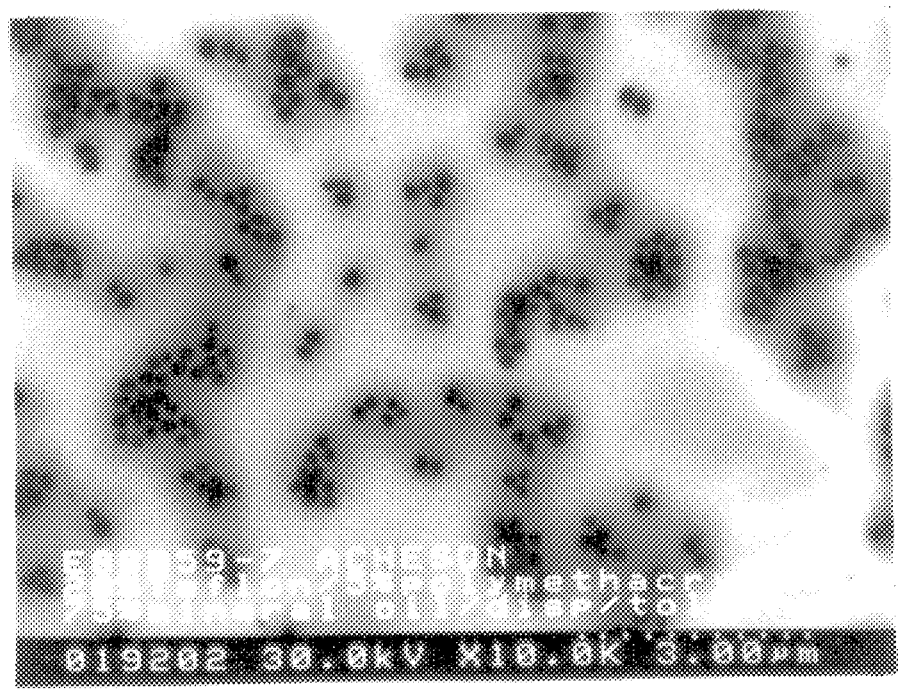

The electron photomicrographs in FIGS. 1-A and 1-B were taken of similarly prepared and handled samples, by the same operator. It is readily apparent that the PTFE particles in FIG. 1-A, the present invention, are more highly dispersed than those in FIG. 1-B. FIG. 1-A shows more single particles and loose chains while FIG. 1-B shows fewer single particles and man more large aggregates.

EXAMPLES

TABLE 1

| PTFE Micropowders used in the examples | |
|---|---|
| PTFE | Description |
| A | High molecular weight dispersion polymer, no irradiation, fine powder with primary particle size ≈0.25 μm |

TABLE 1-continued

PTFE Micropowders used in the examples

| PTFE | Description |
|---|---|
| B | Dispersion polymer which has been irradiated with an electron beam (about 55 Mrad), 1100–1600 acid and acid fluoride groups per million CF2 groups, primary particle size ≈0.25 μm |
| C | Intermediate molecular weight dispersion polymer micropowder, no irradiation. |
| D | Granular (2–4 μm) suspension polymerized PTFE which has been irradiated |
| E | Low molecular weight dispersion polymer micropowder, no irradiation, primary particle size ≈0.1 μm |

Example 1

A mixture of 20% PTFE B (see Table 1), 10% Acryloid 956, and 70% 150N mineral oil was divided into three batches. Each batch was processed by 6 passes through a Microfluidizer M210 manufactured by Microfluidics International Corporation of Newton, Mass.

Samples were taken after each pass. Batch 1 was processed at 10000 psi, batch 2 at 20000 psi, and batch 3 at 30000 psi. The second and sixth pass samples from each batch were analyzed by dynamic light scattering (DLS) to determine average particle size, an indicator of fineness of dispersion. The results in Table 2 show, first, that two passes at 10000 psi gives essentially the same average particle size as 6 passes at 10000 psi. Thus, there is little if any benefit from making the 4 additional passes. Further, 2 passes at 10000 psi gives essentially the same average particle size as 2 passes at 20000 or 30000 psi; there seems to be no benefit from the higher pressures. Finally, the most aggressive operation actually decreases dispersion quality. The apparent average particle size after 6 passes at 30000 psi is actually larger than that after only 2 passes. This same behavior is evident, to a lesser extent, at 20000 psi, where a bimodal particle size distribution was observed in the 6-pass sample. This is believed to be due to shear degradation of the dispersant polymer rendering it less effective at maintaining the PTFE in a dispersed state, which allows flocculation to occur. The effect of increasing pressure on shear degradation is clearly revealed by GPC analysis, which shows the weight average molecular weight of the Acryloid 956 after 6 passes to be 95,500 when processed at 10000 psi, 75000 at 20000 psi, and 69,400 at 30000 psi.

TABLE 2

Effect of processing pressure on particle size

| Processing pressure | Z-average particle size by DLS, nm | |
|---|---|---|
| (psig) | 2 passes | 6 passes |
| 10000 | 358 | 352 |
| 20000 | 361 | 390 (bimodal) |
| 30000 | 360 | >500 |

Traditional methods of preparing fine dispersions of powders in liquids include wet milling with various media in a media mill. Media mills are commercially available from many manufacturers.

Comparative Examples 1 and 2, presented below, describe preparation of PTFE dispersions using two common media mills: a sand mill and a Dyno-mill. Example 2 of the present invention was made using the same base oil as Comparative Examples 1 and 2 so that analytical results can be compared directly.

Sand milling has long been used for preparing dispersions of white pigments, such as TiO2. Advantages of sand milling include low cost and light colored debris from media wear, important factors when dispersing white pigments. Disadvantages include contamination from sand attrition, which is unacceptable for the making of PTFE dispersions for use in lubricants. Zirconia SEPR media, used in the Dyno-mill example, Comparative Example 2, is a commercially available media made of zirconium silicate. SEPR media is significantly more expensive than sand, but also more durable, reducing the amount of contamination by media attrition. However, even with SEPR media, contamination from media attrition still occurs.

All media milling processes suffer some degree of product contamination from media attrition. Even attrition-resistant media suffer from this deficiency to some extent. In addition, harder or more abrasive media can result in contamination from equipment wear. Depending on end use, this may be acceptable, as in the case of white pigments, or unacceptable, as in the case of PTFE dispersions. In the case of PTFE dispersions for lubricants, presence of abrasive media particles is clearly undesirable since such particles could cause abrasive wear of the mechanism being lubricated. Metal contaminants from equipment wear could catalyze oxidation of oil, increase sludge, alter viscosity, etc., thereby shortening lubricant life.

Contamination from media or equipment wear can be determined by elemental analysis of the product dispersion. Elemental analysis of PTFE dispersions by X-ray fluorescence (XRF) is shown in Table 3. It is obvious from inspection of this data that the method of the present invention, Example 2, gives much less contamination than the methods of Comparative Examples 1 and 2. Note that the sulfur present in these samples is essentially that naturally present in the base oil, which was the same in all 3 cases. Therefore, since the sulfur was present in the base oil, the material from the process of the present invention, Example 2, is virtually free of contamination from processing.

TABLE 3

XRF Analysis of PTFE dispersions (results given in ppm).

| Element | Comparative Example 1 | Comparative Example 2 | Example 2 |
|---|---|---|---|
| Na | 140 | 530 | |
| Mg | 36 | | |
| Al | 91 | 41 | |
| Si | 2100 | 93 | |
| S (Note A) | 82 | 120 | 63 |
| Cl | 19 | 41 | |
| K | 17 | | |
| Ca | 17 | 17 | |
| Ti | 20 | | |
| Fe | 108 | | |
| Zr | | 240 | |

(Note A: Sulfur is present in the base oil)

It is well-known that many critical properties of a dispersion depend on the fineness of the dispersion. These properties include, for example, uniformity of a coating and ability of the dispersed product to resist settling. Fineness of dispersion can be evaluated directly, by particle size measurement or microscopy. It may also be evaluated indirectly, by visual observation of a coating or the degree of sedimentation with time.

Particle Size was measured by DLS using a Brookhaven Instrument BI-200SM goniometer, equipped with a 4-watt argon ion laser and BI-9000AT autocorrelator, all commercially available via Brookhaven Instruments. Z-Average particle sizes are reported in Table 2. Examples 1 and 3 give comparable or smaller average particle size vs. Comparative Example 1, but with fewer processing passes through the dispersing equipment. Both Examples have significantly smaller particle size than the commercially available PTFE dispersion (SLA-1612).

TABLE 4

Average particle size (Z-average distribution) by DLS

| Sample | Average particle size (nm) |
|---|---|
| Example 1 (2 passes, regardless of pressure) | 360 |
| Example 3 | 350 |
| Comparative Example 1 | 360 |
| SLA-1612 | 460 |

The commercial scale dispersion from Example 4 was compared to the commercially available PTFE dispersion SLA-1612 by transmission electron microscopy (TEM). The upper image in FIG. 1-A shows the dispersion of Example 3 at 10,000× magnification. Many individual particles are seen, along with some particles which are close or touching in the form of loose chains and small clusters. The lower image of FIG. 1-B shows the commercially available PTFE dispersion, SLA-1612, prepared for TEM in the same way, at the same magnification. A few individual particles are seen, but most particles are present in multi-particle clusters. These differences seen in the TEM images are consistent with the differences in particle size revealed by DLS. DLS would count clusters of several small particles as if they were a single larger particle, resulting in a higher apparent average particle size.

For greater sensitivity, and to make sedimentation stability tests more relevant to end use applications in internal combustion engine lubrication, sedimentation tests were performed on PTFE dispersions diluted to PTFE concentrations similar to those found in retail motor oil additives (about 0.5 to 1.5 weight percent PTFE). Such a test simulates shelf stability of an engine treatment or oil additive, where it is important for the PTFE to remain suspended for long periods of time in storage or on a retailer's shelf.

This approach was used to evaluate samples of PTFE dispersions from Example 2, Comparative Example 1, and a commercially available PTFE dispersion (SLA-1612, purchased from Acheson Colloids). All of these dispersions are concentrates which contain nominally 20% PTFE. Samples of each material were diluted with fully formulated 10W30 motor oil to obtain mixtures containing 0.5%, 1%, and 1.5% PTFE by weight. Each diluted sample was homogenized for 90 seconds using an IKA Ultra-Turrax T2S disperser motor equipped with a 10 mm rotor-stator dispersing element (part number S25N-10G).

The nine homogenized dispersions were placed in 2 ounce, square, clear glass bottles and allowed to stand undisturbed at ambient room temperature (20°–25° C.). They were examined periodically to determine extent of settling. Relative amounts of settling were determined by measuring the height of any clarified upper zone and the amount of sediment on the bottom of the bottle. Final observations, recorded after 6 months, are shown in Table 5 below. In every case, the dispersion prepared by Example 2 exhibits less settling than the two comparative dispersions, as evidenced by a smaller clear top layer, less sediment on the bottom of the bottle, or both.

TABLE 5

Sedimentation test results-ambient temperature, 6 months

| Source of PTFE | PTFE concentration in diluted sample | | |
|---|---|---|---|
| | 0.5% | 1.0% | 1.5% |
| Example 2 | 3 mm clear top layer. Sediment covers ⅓ in 2 corners of bottle | 4 mm clear top layer. Sediment covers ⅓ of bottle bottom | 2 mm clear top layer. Sediment covers ¾ of bottle bottom |
| Comparative example 1 | 8 mm clear top layer. Sediment around perimeter and covering ⅓ of bottle bottom | 4 mm clear top layer. Sediment covers ⅔ of bottle bottom | 5 mm clear top layer. Sediment covers ¾ of bottle bottom |
| Commercial dispersion (SLA-1612) | 8 mm clear top layer. Sediment around perimeter and covering ⅓ of bottle bottom | 8 mm clear top layer. Sediment covers ⅔ of bottle bottom | 7 mm clear top layer. Sediment covers ¾ of bottle bottom |

Samples of PTFE dispersion from Example 2, Comparative Examples 1 and 2, and a sample of SLA-1612 (a PTFE dispersion commercially available from Acheson Colloids Company of Port Huron, Mich.) were diluted by mixing one part of dispersion with 19 parts of fully formulated 5W30 motor oil (Motorcraft brand). 50 mL samples in conical-bottomed centrifuge tubes were placed in an oil bath maintained at 100° C. for 144 hours. The height of the clarified top layer and the bottom sediment layer were measured, and are reported in Table 6. Again, the dispersion prepared by the current method in Example 2 is superior to those of the Comparative Examples and SLA-1612.

TABLE 6

Stability of diluted dispersions, 100° C., 144 hours.

| PTFE dispersion | Height of clarified upper zone, height of bottom sediment layer, mm |
|---|---|
| Example 2 | 1, <1 |
| Comparative Example 1 | 1, 1 |
| Comparative Example 2 | 1, 4 |
| Commercial dispersion (SLA-1612) | 1, 2 |

Comparative Example 1

This Example describes a dispersion prepared by sand milling.

A mixture of 4328 g 150N oil, 618 g Acryloid 956, and 1236 g PTFE B was mixed with a standard bottom sweeping blade mixer for 15 minutes. This premix was pumped through a 0.5 gallon sand mill at 110 ml/min (equivalent to about 6567 g/hour or 1.74 gallons/hour). The sand mill was operated at 2450 rpm, corresponding to a tip speed of 9.6 m/sec. The sand charge was 2392 g of 20–30 mesh Quackenbush Quack Sand, corresponding to 91% media volume (100% media volume=maximum amount of media that can be fit into the mill) or 55% fractional volume (volume of the mill actually occupied by media/total volume of mill) of the mill. The PTFE mixture was processed a total of 5 passes through the mill. Total processing time was about 4.7 hours, equivalent to an average overall processing rate of about 1313 g/hour (0.348 gallon/hour).

Comparative Example 2

This Example describes a dispersion prepared with a Dyno-Mill using zirconia-silica ceramic media.

A mixture of 4900 g 150N oil, 700 g Acryloid 956, and 1400 g PTFE B was mixed with a standard bottom sweeping blade mixer for 15 minutes. This premix was pumped through a 1.4 liter Dyno-Mill (Chicago Boiler Type KDL Pilot) charged with 1200 mL SEPR media (SEPR, Mountainside, N.J. 0.8–1.0 mm zirconia silica ceramic spheres, 83% media volume, 50% fractional volume) operated at 2387 rpm, corresponding to a tip speed of 10 m/sec). Feed rate was 158 mL/minute (9433 g/hour or 2.51 gallons/hour). A total of 5 passes was made through the mill. The overall average processing rate was therefore about 1887 g/hour or 0.5 gallon/hour.

Example 2

This Example describes a dispersion preparing using a Microfluidizer, 3 passes at 8000 psi.

A mixture of 800 g PTFE B, 400 g Acryloid 956, and 2800 g of 150N oil (the same oil used in Comparative Examples 1 and 2) was mixed in a rotor-stator homogenizer (Silverson L4R laboratory mixer with ⅓ hp, 6000 rpm motor, two arm mixer with small square-hole high-shear screen, 8 minutes at full speed). The resulting premix was processed by three passes through a Microfluidizer (Microfluidies Corp. M110 with F12Y interaction chamber) at 8000 psig.

Example 3

This Example describes a larger scale preparation of a dispersion by 2 passes through a Microfluidizer at 20,000 psi.

The process of the current invention was scaled up to demonstrate quality of a commercial scale production batch. A mixture of 88 lb. PTFE B, 44 lb. Acryloid 956, and 308 lb. 150N oil was mixed for 30 minutes with a Cowles mixer and processed by two passes through a Microfluidizer M210 at 20,000 psi. Average flow rate for the two passes was 0.24 gallon/minute. Since two passes were made, the net production rate is half of that value, 0.12 gallons/min. or 7.2 gallons/hour.

Comparative Example 3

This example illustrates the requirement for both a dispersion polymerized PTFE which has been surface functionalized and a dispersant. Dispersions in this comparative example were prepared by sand milling in a paint shaker. While this method of preparing dispersions does not produce as high a quality and uniform dispersion as the process of the present invention, it reveals the basic requirements of the process. Mixtures were prepared on a 15 g scale from each of the 5 micropowders in Table 1. Each mixture contained 20% PTFE (3.0 g), some of which were surface functionalized by electron beam irradiation. Some mixtures contained 10% Acryloid 956 (1.5 g) dispersant and some contained no dispersant, as indicated in Table 7. Each mixture was placed in a 2 oz. glass bottle along with 10 g of Standard Ottawa Sand. The bottles were carefully packed in a 1-gallon paint can and shaken, using a Red Devil paint shaker (Cat. No. 5119, 0.25 hp), for 30 minutes. The samples were removed from the paint can and allowed to stand undisturbed for 72 hours. Each mixture was ranked visually using the 1 to 5 scale described below where 1 is best and 5 is worst. The results, shown in Table 7, clearly show that both a dispersion polymerized PTFE which has been surface functionalized (irradiated) and a dispersant are required to obtain a high-quality, stable dispersion.

TABLE 7

| | Dispersion from Comparative Example 3 | |
|---|---|---|
| PTFE | 10% Acryloid 956 | No Acryloid |
| Unirradiated dispersion polymer (PTFE A) | 5 | 5 |
| Irradiated dispersion polymer (PTFE B) | 1 | 5 |
| Unirradiated dispersion polymer (PTFE C) | 5 | — |
| Irradiated granular PTFE (PTFE D) | 5 | — |
| Unirradiated dispersion polymer (PTFE E) | 5 | — |

The visual ranking system is as follows:

1. Tight layer of settled sand. No sign of a settled layer of PTFE. Even dispersion with no signs of incipient settling (e.g. stratification or lightness near surface). Even coating on walls of bottle with no streaking.

2. Some lightening at surface of liquid suggesting some settling. Slight streaking when coated on walls of bottle.

3. More stratification with a distinct layer of settled PTFE, but supernatant oil still remains all cloudy. More noticeable streaking when coated on bottle walls.

4. More severe settling with a larger, more distinct layer of PTFE, but top layer still cloudy. No clear zone.

5. Either completely separated with a completely clear zone or completely mixed, i.e. sand not settled as a distinct layer but mixed in with the PTFE. A completely mixed situation occurs when the viscosity of the mixture is so high that even sand does not settle; rather the mixture forms a stable structure of intermixed sand and PTFE. A settled sand layer topped by a settled PTFE layer and a clear supernatant indicates that the PTFE was dispersed, but reflocculated completely and settled. Clarification with PTFE floating suggests poor wetting.

Comparative Example 4

Figure 2:
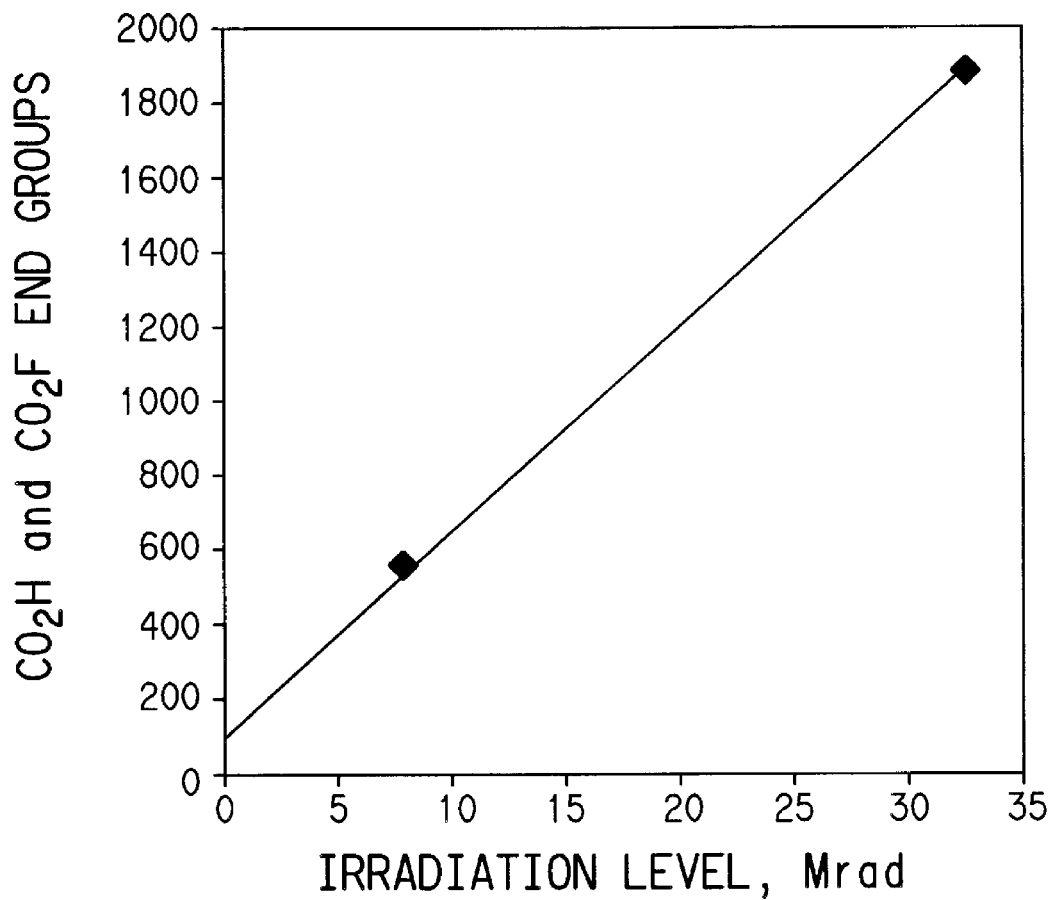
FIG. 2 shows the density of carboxylic acid and acid fluoride groups on the PTFE particle as a function of the irradiation level in Mrad.

This example shows that there is a minimum level of surface functionalization necessary to obtain a stable dispersion. This example is based on a dispersion polymer of TFE which was not irradiated, PTFE E from Table 1. Scanning electron microscopy showed primary particles ranging in size from about 0.07 $\mu$m to 0.12 $\mu$m. This PTFE was irradiated with an electron beam at several different levels and the polymers were analyzed to determine the relationship between irradiation level and the number of carboxylic acid and acid fluoride end groups per million $CF_2$ groups. The results, reported in Table 8 and shown graphically in FIG. 2, show a linear relationship between irradiation level (over this range) and end groups introduced. Note: this linear relationship may not hold in general for other PTFE and may not continue beyond this irradiation range.

TABLE 8

Effect of irradiation level on number of acid
and acid fluoride groups.

| Irradiation level, Mrad | Acid and acid fluoride groups per million CF2 groups |
|---|---|
| 0 (PTFE E) | 80 |
| 8 | 560 |
| 32 | 1850 |

Samples of the unirradiated PTFE E itself and of PTFE E after it was irradiated with an electron beam at 4,8,12, and 36 Mrad, were mixed with 150N mineral oil using the paint shaker sand milling technique described above. The composition of all dispersions was 20% PTFE, 10% Acryloid 956, and 70% 150N oil. After standing for 72 hours, the mixtures were evaluated visually and ranked. Results are given in Table 9 below.

TABLE 9

Effect of extent of surface functionalization
(electron beam irradiation) on dispersion
quality.

| Sample | Description |
|---|---|
| 0 Mrad (PTFE E) | 5 (completely mixed) |
| 4 Mrad | 2 (clarification near liquid surface) |
| 8 Mrad | 1 |
| 12 Mrad | 1 |
| 36 Mrad | 1 |

These results suggest that at least 4 Mrad irradiation, more preferably at least 8 Mrad, is required for this PTFE to be dispersible in mineral oil. Based on the linear relationship between end groups and irradiation level, this corresponds to at least about 315 and more preferably about 540 carboxylic acid and carboxylic acid fluoride end groups per million CF2 groups.

Comparative Example 5

This example shows the evaluation of potential dispersants using the method of sand milling in a paint shaker. This technique allows one to evaluate the effectiveness of the dispersant as well as to determine the desired concentration to be used when the dispersion is made using the dispersion process of the present invention.

A series of mixtures were prepared with the same nominal composition: 20% PTFE, 10% dispersant, and 70% base oil, but using a variety of different dispersants. Fifteen grams of each mixture was milled with 10 g sand in a paint shaker for 30 minutes. The dispersions were allowed to stand undisturbed for 72 h, then rated visually on the 1 (best) to 5 (worst) scale described above.

TABLE 10

Visual ranking of test dispersions from
Comparative Example 5.

| Dispersant | Rating |
|---|---|
| None | 5 |
| Acryloid 954 (RohMax) | 1 |
| Acryloid 956 (RohMax) | 1 |
| Acryloid 985 (RohMax) | 1 |
| Paratone 8510 (Paramins) | 1 |
| Paratone 8511 (Paramins) | 1 |
| TLA 656 (Texaco) | 2 |
| TLA 1605 (Texaco) | 2 |
| TLA 7700 (Texaco) | 5 |
| MobilAD C203 (Mobil) | 1 |

What is claimed is:

1. A process for forming a dispersion of dry polytetrafluoroethylene particles in an organic carrier fluid comprising the steps of:

(a) surface functionalizing the polytetrafluoroethylene particles having an average primary particle size of less than 1 micron with electron beam or gamma irradiation of at least 4 Mrad in the presence of atmospheric oxygen and water or selecting polytetrafluoroethylene particles having an average primary particle size of less than 1 micron that have been subjected to electron beam or gamma irradiation of at least 4 Mrad in the presence of atmospheric oxygen and water to functionalize the particle surface;

(b) mixing the irradiated particles with the liquid and at least one dispersant in an amount sufficient to stabilize the dispersion to form a mixture;

(c) passing the mixture, at least once, through a plurality of nozzles within a liquid-jet interaction chamber at a pressure of at least 1000 psi to deagglomerate the polytetrafluoroethylene particles.

2. The process of claim 1 wherein the average primary particle size of the polytetrafluoroethylene particles is about 0.25 microns or smaller.

3. The process of claim 1 wherein the irradiation is carried out at least 8 Mrad.

4. The process of claim 1 wherein the dispersant is characterized in that it has a molecular structure having an interacting group which can interact with the surface-functionalized particles, a solubilizing group which can interact with the carrier fluid of the dispersion and a sufficiently high molecular weight to provide effective steric stabilization for the dispersed particles.

5. The process of claim 1 wherein the carrier fluid is a lubricant.

6. The process of claim 1 wherein the carrier fluid is selected from the group consisting of paraffinic and naphthenic mineral oils, hydrocracked mineral oils, solvent refined oils, and blends of these oils, aromatic and aliphatic hydrocarbons, polyalphaolefins, hydrogenated polyalphaolefins, alkylated aromatics, esters, diesters, polyol esters, and complex esters, phosphate esters, dihydrocarbyl carbonates, ethers, polyalkylene glycols, perfluoroalkyl polyethers, silicone fluids, silahydrocarbons, alcohols, ketones, amines, and heterocyclic compounds, N-methyl pyrolidinone, isophorone, and tetrahydrofuran and mixtures of any combination of these.

7. The process of claim 1 wherein the dry polytetrafluoroethylene particles are dispersion polymerized particles.

* * * * *